United States Patent
Johnson et al.

(10) Patent No.: US 10,719,058 B1
(45) Date of Patent: Jul. 21, 2020

(54) SYSTEM AND METHOD FOR MEMORY CONTROL HAVING SELECTIVELY DISTRIBUTED POWER-ON PROCESSING

(71) Applicant: CADENCE DESIGN SYSTEMS, INC., San Jose, CA (US)

(72) Inventors: Jerome J. Johnson, Cedar Park, TX (US); John MacLaren, Austin, TX (US); Sreenivasan Kandagatla, Austin, TX (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 120 days.

(21) Appl. No.: 15/714,068

(22) Filed: Sep. 25, 2017

(51) Int. Cl.
*G05B 19/045* (2006.01)
*G06F 12/126* (2016.01)
*G06F 9/4401* (2018.01)
*G06F 11/22* (2006.01)

(52) U.S. Cl.
CPC ......... *G05B 19/045* (2013.01); *G06F 9/4403* (2013.01); *G06F 11/2284* (2013.01); *G06F 12/126* (2013.01)

(58) Field of Classification Search
CPC . G05B 19/045; G06F 9/4403; G06F 11/2284; G06F 12/126
See application file for complete search history.

(56) References Cited

U.S. PATENT DOCUMENTS

| 2012/0260137 | A1* | 10/2012 | Berke | G06F 13/1673 |
| | | | | 714/721 |
| 2014/0177371 | A1* | 6/2014 | Ellis | G11C 29/023 |
| | | | | 365/222 |
| 2018/0113648 | A1* | 4/2018 | Brandl | G06F 11/073 |

OTHER PUBLICATIONS

DFI "DFI 3.0 Specification" [online] May 18, 2012 [Retrieved on Mar. 6, 2019] Retrieved from the Internet <URL: http://bfiles.chinaaet.com/justlxy/blog/20170809/1000019445-636378858871957981789​0087.pdf> (Year: 2012).*

(Continued)

*Primary Examiner* — David Yi
*Assistant Examiner* — Dustin B. Fulford
(74) *Attorney, Agent, or Firm* — Tarolli, Sundheim, Covell & Tummino LLP

(57) ABSTRACT

A system and method are provided for memory control, having selectively distributed power-on processing. A memory controller executes responsive to a master control operation to actuate a plurality of operational tasks on a memory device. The memory controller includes a first power-on block executable to actuate one or both of initialization and training operations corresponding to the memory device. A PHY portion coupled to the memory controller portion executes to adaptively configure control, address, and data signals for physically compatible passage between the controller portion and memory device. The PHY portion includes a second power-on block executable to actuate one or both of an initialization operation and a training operation corresponding to the memory device. The PHY portion is configured according to the initialization and training operations, wherein each of the initialization and training operations are selectively actuated responsive to one of the power-on blocks.

15 Claims, 4 Drawing Sheets

(56) References Cited

OTHER PUBLICATIONS

Lattice Semiconductor "DDR3 PHY IP Core User Guide" [online] Oct. 2016 [Retrieved on Mar. 6, 2019] Retrieved from the Internet <URL: http://www.latticesemi.com/-/media/LatticeSemi/Documents/UserManuals/1D/DDR3PHYIPCoreUsersGuide.ashx?la=en> (Year: 2016).*

Altera "External Memory Interface Handbook vol. 3: Reference Material". [online] Published May 4, 2015. [Retrieved on Nov. 4, 2019] Retrieved from the Internet <URL: https://www.intel.com/content/dam/www/programmable/us/en/pdfs/literature/hb/external-memory/emi_rldram_ii_ug.pdf> (Year: 2015).*

Altera "DDR and DDR2 SDRAM High-Performance Controller User Guide" [online] Published Mar. 2009 [Retrieved on Oct. 31, 2019] Retrieved from the Internet <URL: https://www.intel.com/content/dam/www/programmable/us/en/pdfs/literature/ug/ug_ddr_ddr2_sdram_hp.pdf> (Year: 2009).*

* cited by examiner

SYSTEM AND METHOD FOR MEMORY CONTROL HAVING SELECTIVELY DISTRIBUTED POWER-ON PROCESSING

BACKGROUND OF THE INVENTION

The subject system and method are generally directed to the selectively optimized adaptation of a memory controller for a memory device during power-on processing. More specifically, the subject system and method provide for control of power-on processing operations in selectively distributed manner, whereby one or more power-on processing operations are selectively actuated by portions of the system other than just the memory controller portion. Such operations as initialization and training may be selectively actuated by either the memory controller or a physical interface portion of the system.

Memory controllers are well known in the art. They are implemented as digital circuits dedicated to controlling/managing the flow of data written to and read from one or more memory devices, to which they are adapted as needed for properly calibrated operation therewith when initially powered on or periodically re-booted/re-started. Memory controllers may be suitably formed as separate devices or integrated with a central processing unit or other main controller, and serve the memory storage and access needs of various control or user application 'master' operations processed thereby. Memory controllers implement the logic necessary to read from and write to various types of solid state memory devices, examples of which include dynamic random access memory (DRAM), as well as electrically programmable types of non-volatile memory such as flash memory, and the like.

The particular operations required for power-on processing may vary depending on numerous factors applicable to a particular implementation of a given memory controller. These factors include among other things the type and configuration of the memory device to be accessed, parametric settings predefined for the particularly intended application, and requirements to be met for compliance with industry standards. As noted in following paragraphs, industry standards such as those established by the so-called Joint Electron Device Engineering Council (JEDEC) for semiconductor memory circuits and devices, for example, define operational specifications for certain power-on processing operations for memory controllers. Other industry standards, such as the so-called DFI (DDR PHY Interface) standard protocol defines the connectivity between a DDR-type source synchronous memory controller and a physical interface portion through which it communicates with DDR-type memory devices.

Historically, the initialization and training operations required to enable a memory controller to properly read and write data to a memory device through an intervening physical interface component were relegated exclusively to the memory controller for execution. The physical interface component remained generally passive. Although subjected to various configuring/calibrating processes during the required initialization and training, known physical interface components have not served to independently actuate any part of those initialization or training operations itself. While some physical interface components are known to have been expanded in function to 're-do' certain restorative training, none have been provided with sufficient measures to provide independent actuation of initialization and/or training operations in connection with power-on processing of memory control systems. Nor has any memory controller been provided with sufficient measures to suitably interact with a physical interface component in that regard.

There is therefore a need for a memory controller system and method capable of selectively distributing actuation control for such operations required during power-on processing, while preserving compliance with applicable operational standards. There is also a need for a memory controller system and method which provides selective distribution of control over initialization and training operations in connection with power-on processing towards optimizing the efficiency and flexibility of adaption between a memory controller and a particular memory device.

SUMMARY OF THE INVENTION

It is an object of the present invention to provide a system and method for memory control capable of selectively distributing actuation control for such operations required during power-on processing, while preserving compliance with applicable operational standards.

It is another object of the present invention to provide a system and method for memory control having selective distribution of control over initialization and training operations in connection with power-on processing.

It is yet another object of the present invention to provide a system and method for memory control having efficient and flexible adaption between a memory controller and a particular memory device during power-on processing.

These and other objects are attained in a system for controlling access to a memory device according to a master control operation, which provides for selectively distributed power-on processing. The system includes a memory controller portion executing responsive the master control operation to actuate a plurality of operational tasks on the memory device, the operational tasks including at least read and write operations for selectively addressed storage locations defined in the memory device. The memory controller portion includes a first power-on block executable to actuate one or both of an initialization operation and a training operation corresponding to the memory device. A physical interface (PHY) portion is coupled to the memory controller portion, which PHY portion executes to adaptively configure control, address, and data signals for physically compatible passage between the controller portion and the memory device. The PHY portion includes a second power-on block executable to actuate one or both of an initialization operation and a training operation corresponding to the memory device. The PHY portion is configured according to the initialization and training operations, wherein each of the initialization and training operations is selectively actuated responsive to one of the first and second power on blocks.

In accordance with certain embodiments of the present invention, a method is provided for controlling access to a memory device according to a master control operation, with selectively distributed power-on processing. The method includes executing a memory controller portion responsive to the master control operation to actuate a plurality of operational tasks on the memory device, where the operational tasks include at least read and write operations for selectively addressed storage locations defined in the memory device. Established in the memory controller portion is a first power-on block executable to actuate one or both of an initialization operation and a training operation corresponding to the memory device. A PHY portion coupled to the memory controller portion is executed to adaptively configure control, address, and data signals for physically compatible passage between the memory controller portion and the memory device. A second power-on block is established in the PHY portion to be executable to actuate one or both of an initialization operation and a training operation corresponding to the memory device. Each of the initialization and training operations is selectively actuated responsive to one of the first and second power on blocks; and, the PHY portion is configured according to the training operation.

In accordance with certain other embodiments, a system is provided for controlling access to a memory device according to a master control operation, the system having selectively distributed power-on processing. A memory controller portion executes responsive the master control operation to actuate a plurality of operational tasks on the memory device, the operational tasks including at least read and write operations for selectively addressed storage locations defined in the memory device. The memory controller portion includes a first power-on block executable to actuate one or both of an initialization operation and a training operation corresponding to the memory device, and a first configuration block coupled to the first power-on block to selectively enable or disable each of the initialization and training operations thereof. A PHY portion is coupled to the memory controller portion, which PHY portion executes to adaptively configure control, address, and data signals for physically compatible passage between the memory controller portion and the memory device. The PHY portion includes a second power-on block executable to actuate one or both of an initialization operation and a training operation corresponding to the memory device, and a second configuration block coupled to the second power-on block to selectively enable or disable each of the initialization and training operations thereof. Each of the first and second power-on blocks includes an initialization state machine and a training state machine. The initialization and training state machines are independently executable, and the PHY portion is configured according to the initialization and training operations. Each of the initialization and training operations is selectively actuated responsive to one of the first and second power on blocks.

DETAILED DESCRIPTION OF THE PREFERRED EMBODIMENTS

Figure 1:
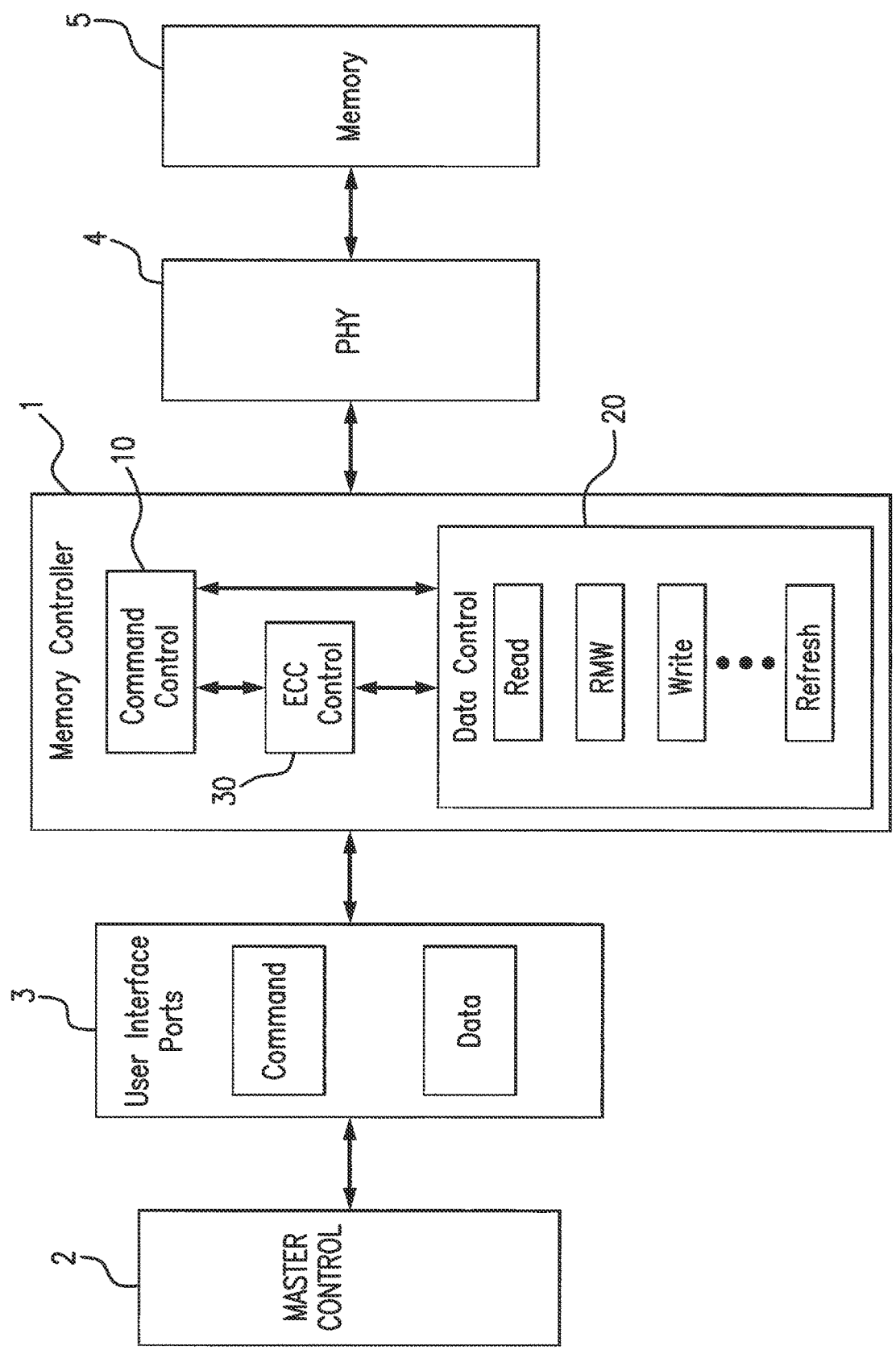
FIG. 1 is a schematic diagram illustrating a system formed in accordance with one exemplary embodiment of the present invention, operably intercoupled to provide control of memory to support processing of a master control operation, in one illustrative application.

Reference is now made in illustrative level of detail to exemplary embodiments, which are illustrated in the accompanying drawings, wherein like reference numerals refer to like elements throughout. The embodiments are described below in order to illustrate and explain the disclosed system and method with reference to the drawing figures.

Briefly, the subject system and method are generally directed to memory control for a memory device, having selectively distributed control over certain power-on operations required for proper adaptation to the memory device. The disclosed memory control system includes a memory controller portion which is served by an intervening physical interface (PHY) portion to access the memory device. Suitable power-on processing measures are reconfigurably provided in the memory controller and PHY portions of the system, such that control over initialization and training operations carried out during the system's power-on processing is selectively either shared between the memory controller and PHY portions, or otherwise allocated to one or the other of these portions.

Referring to FIG. 1, there is shown a general schematic diagram illustrating a memory controller portion 1 formed in accordance with one exemplary embodiment of the present invention operably intercoupled with other subsystems in an illustrative application. As generally shown, the memory controller portion 1 serves to provide control of a memory 5 (formed by one or more memory devices of any suitable type and configuration known in the art) to support processing of a master control operation by a master controller 2. The memory controller system 1 communicates with the master controller 2 through one or more user interface ports 3, and with the memory device(s) 5 through a physical interface (PHY) portion 4 configured with a suitable interface standard known in the art for the memory 5.

The overall system schematically illustrated in FIG. 1 may be implemented in any known form, depending on the particular requirements of the intended application. For example, the overall system may be realized by discretely interconnected subsystems, or sufficiently integrated in the form of a system-on-chip (SOC) or the like, depending again on the particular requirements of the intended application. As the master controller, user interface port, PHY, and memory portions 2, 3, 4, and 5 may be of any suitable type and configuration known in the art, subject to the particular requirements of a given application, no further description thereof is needed for description of features relating to the memory controller portion 1. Those skilled in the art will recognize that the overall system shown will typically include numerous subsystems, logic components, driver circuit portions, and the like other than those generally illustrated in FIG. 1 to carry out particularly intended functions. In the interests of brevity and clarity, those particular portions/functions outside the system and method disclosed herein are not shown, but will be apparent to those skilled in the art in the context of the particular application intended.

Memory controller portion 1 generally includes a command control segment 10 coupled to a data control segment 20 and an error control segment 30. In the embodiment shown, the data control segment 20 preferably includes one or more digital circuits which implement the functional logic to carry out a plurality of data access operations on memory 5. These data access operations include read, write, masked write, and read-modify-write (RMW) operations conducted on selectively addressed storage locations defined in the memory 5. The data access operations preferably include control of additional functions for proper interface with the particular type of memory device(s) 5 employed, as well as others known in the art.

The error control segment 30 is operably coupled to the data control segment 20, and preferably includes one or more digital circuits which implement the functional logic for detecting and correcting error in segments of data as stored in memory 5. The error control segment 30 preferably includes execution of ECC processing of predetermined code format, such as a format of SECDED type, to detect error in a corrupted data segment read from the memory 5. The error control segment 30 is configured to correct the data segment read from the memory having error that is correctable with the given ECC, and report (for the master control operation) those data errors which are detected but are not correctable with the given ECC. The error control segment 30 preferably also provides intermediate storage of ECC bytes generated or read in association with data bytes during the execution of various data access operations, for cooperative transmission with their data bytes either to the PHY portion 4 (for writing operations) or error-checking of retrieved data for return to the user interface ports 3 (for reading operations).

The command control segment 10 is operably coupled to both the data control and error control segments 20, 30. The command control segment 10 is preferably formed by one or more digital circuits which implement the functional logic for generating commands to actuate various data access operations of the data control segment 20. The command control segment 10 preferably includes suitable units for carrying out memory access operations responsive to memory transactions of user applications involving ECC-protected data words. In certain embodiments and applications, these may include address translation and command translation functions involved, for example, in adaptively splitting the memory addressing of ECC and data for inline ECC storage configurations.

The command control segment 10 is preferably formed with suitable digital circuits to carry out the initialization and/or training processes required for the particular implementation at hand. This preferably includes the functional logic and storage of system settings sufficient to coordinate with the PHY portion 4 for shared execution of the required initialization and training operations therewith, or delegation of the same thereto.

Consistent with the particular embodiment and application, the memory controller portion 1 may be configured to control a memory device formed by a plurality of independently accessible/selectable integrated circuit (IC) chips, wherein each chip of the memory device defines a plurality of banks. Each bank is preferably organized in illustrative applications with its storage cells arrayed in rows and columns, with each row of storage cells of that bank preferably forming an individually accessible page of cells. Each selectable chip defines at least one selectable rank. In certain cases, a physical chip is suitably configured with multiple distinct storage units (such as front and rear sides of a double sided memory structure, or different stacked components of a 3DS stacked memory structure) respectively defining multiple, independently accessible/selectable ranks. Except to the extent their distinction is made applicable by the structural makeup of a given memory device, the terms chip and rank are used synonymously herein. Unless otherwise indicated, a chip or rank may be referred to herein by shorthand reference to the chip select (CS) designations by which they are addressed.

Depending upon its type and class, known memory devices typically define between 2 to 16 banks of memory. The banks of different devices are sized with widely varying numbers of pages, though typically ranging from $2^{12}$ to $2^{18}$ pages of memory cells within each bank. In a typical DRAM memory device, only one page may be open at a time within each of its banks. Thus, in an 8-bank device, as many as 8 unique pages may be open at any given time, one page in each bank. To gain access to a different page within the same bank, the currently open page must first be closed before that different page may be opened.

Power-on Processing: Initialization and Training

When the system is powered on, such as at initial startup or at subsequent restart, proper operation compatible with the particular memory device 5 employed for a given application requires suitable system adaptation to the memory. This typically entails actuation of a two-step process including predetermined initialization and training operations, responsive to which system components like the PHY 4 are suitably configured to support proper physically interfaced interaction between the memory controller 1 and memory device 5.

The initialization and training operations required will vary with the particular requirements of the intended embodiment and application. In the example of a memory controller portion 1 compliant with the JEDEC and DFI standards known in the art, for instance, typical initialization operations may include:

Applying power
  Waiting a certain amount of time
  De-asserting reset
  Waiting a certain amount of time
  Asserting CKE (clock enable signal)
  Waiting a certain amount of time
  Programming mode registers
  Carrying out output impedance (ZQ) calibration Typical training operations may include:

Training the Command Address (CA) bus
  Training the Write bus
  Training the Data (DQ) bus Such initialization and training operations generally account for device-device and even case-case variations that could potentially disturb proper reading and writing to/from the given memory device. These differences may include variations and incompatibility in certain timing characteristics between memory controller and PHY and the memory device. They may include Temperature/Voltage/Process (PVT) process variations, and differences in certain board characteristics potentially affecting memory access. Required initialization and training operations enables these differences to be discovered and adjusted as needed to establish compatible interaction and proper communication.

The JEDEC industry standard sets forth specifications applicable to semiconductor memory circuits, while the so-called DFI (DDR PHY Interface) standard protocol defines the connectivity between a memory controller and PHY 4 for use with DDR-type memory devices. Generally, the DFI standard, which establishes how a particular memory controller 1 communicates with the given PHY 4, has been premised heretofore on the intelligence required for controlling actuation of all or most of the commands and tasks needed for power-on processing of a memory access system to reside in the memory controller 1, not in the PHY 4. Hence, the initialization and training operations were typically designed for actuation exclusively by the memory controller; and, known PHY designs were typically neither equipped for nor expected to carry out any substantial part of the power-on processing.

In accordance with certain aspects of the present invention, PHY 4 is equipped and configured with suitable measures to independently actuate some or all of the initialization and training operations required for power-on processing, in place of the given memory controller 1. Training operations are particularly well suited for PHY actuation in this regard, since those operations largely serve to adjust parametric settings within the PHY 4 for proper exchange of information with the memory device 5. Actuating such operations locally via the PHY 4 itself make attainable substantial gains in terms of simplicity, efficiency, degree of control, and the like. This is especially so as memories increasingly operate at higher frequency and faster speed, requiring increasingly more extensive training.

Yet the prevailing assumption of the DFI specification is for the memory controller 1 to actuate all of the initialization and training required at power-on processing, whether that be in connection with initial system start up or at intermediate system re-start/re-boot. According to this prevalent specification, when a predetermined indication (for instance, a DFI init start signal) is asserted by the memory controller 1, further power-on processing is normally suspended while certain configurations/calibrations are completed upon circuitry within the PHY 4, such as to lock its delay locked loops (DLL) (or phase locked loops, PLL, if applicable). Once the PHY 4 eventually asserts a predetermined indication in response (for instance, a DFI init complete signal), the memory controller 1 resumes further power-on processing to complete any remaining initialization and/or training operations. For example, the PHY's assertion of the DFI init complete signal is taken by the memory controller 1 to mean that the PHY 4 has been readied to accept commands, whereupon the memory controller 1 sends such commands for further initialization as for memory reset, assertion of CKE's, and ZQ calibration, and for further training as for read/write leveling through the buses, in accordance with the DFI or other applicable protocol.

In accordance with certain aspects of the present invention, this conventional (or legacy) power-on processing may be preserved as one mode of processing. On the other hand, where the PHY 4 is to take on control over actuating some or all of initialization and training operations, the system may be selectively set for additional modes of power-on processing. Preferably, system programmably sets a predefined parametric value—for instance, a two-bit setting stored in one or more configuration registers serving the memory controller 1 and PHY 4—to activate one of the following modes of power-on processing:

1. The memory controller 1 controls actuation of both the initialization and training operations.
2. The memory controller 1 controls actuation of the initialization operation, and the PHY 4 controls independent actuation of the training operation.
3. The PHY 4 controls actuation of both the initialization and training operations.

Figure 3:
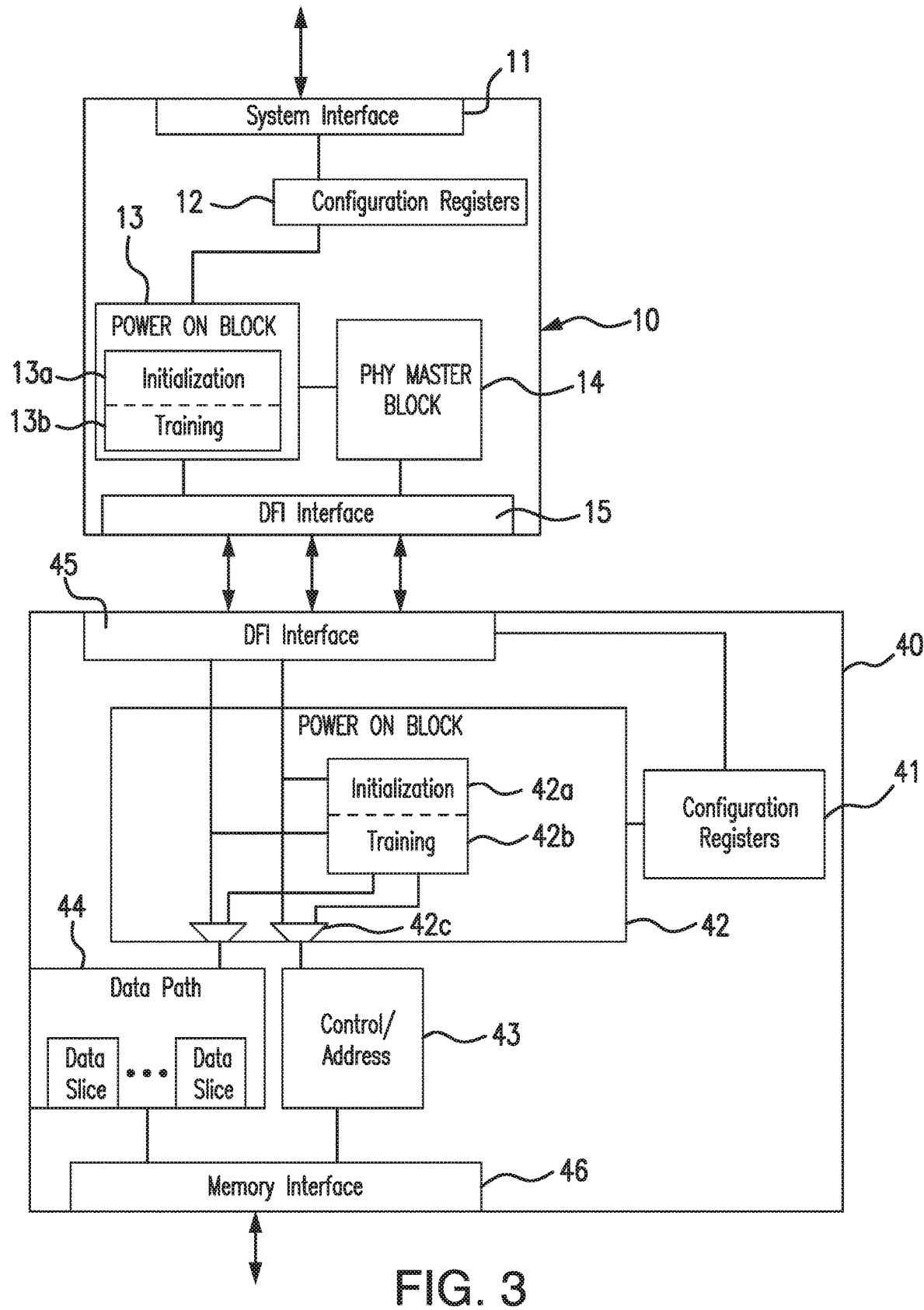
FIG. 3 is a schematic diagram illustrating the intercoupling of certain functional components of a memory controller and PHY portions in the embodiment shown in FIG. 1; and, FIG. 4 is a flow diagram illustrating a flow of processes generally carried out for selectively distributed power-on processing by the embodiment shown in FIGS. 1 and 3.
Figure 4:
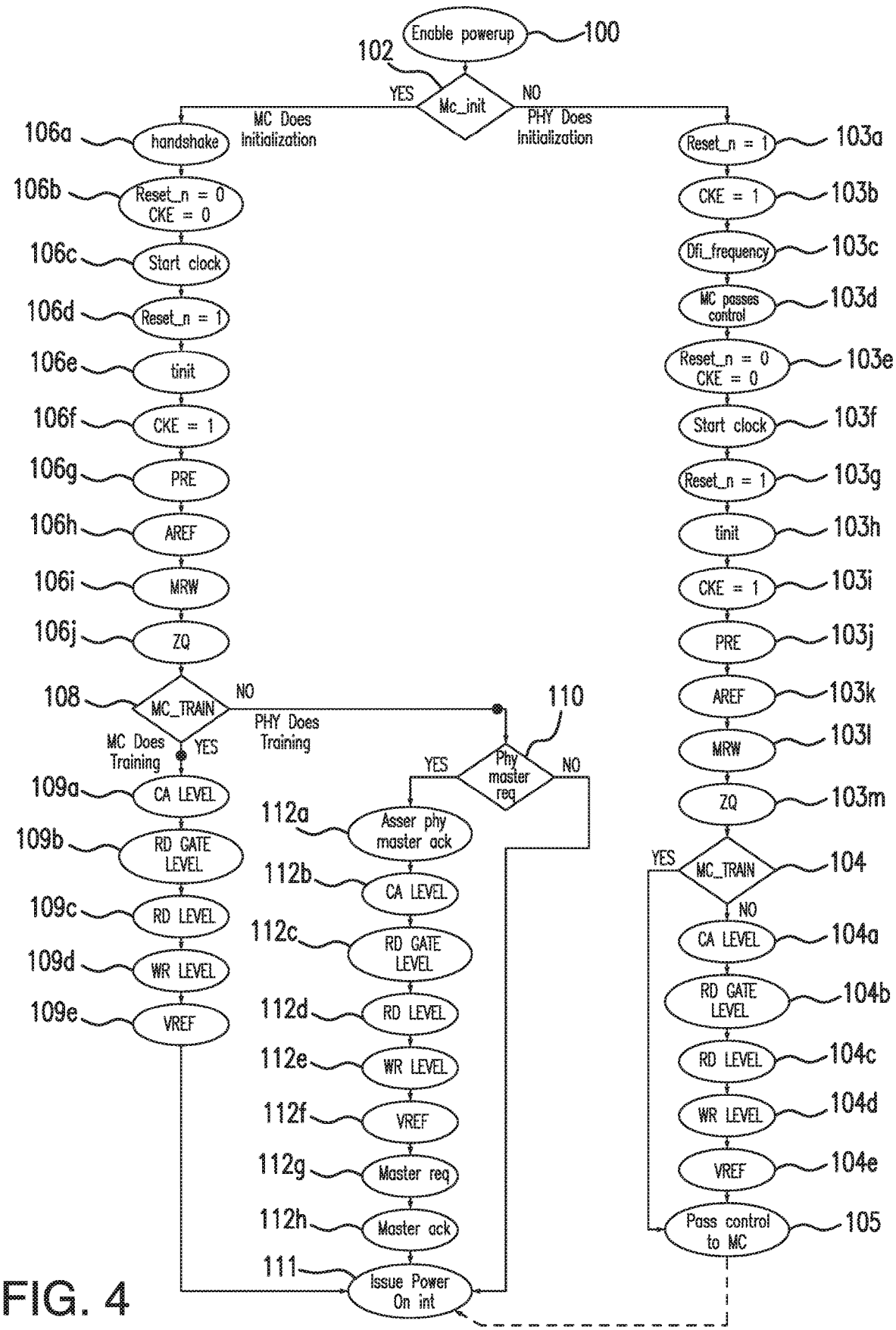

Each of the three power-on processing modes made selectively available via the exemplary embodiment of the present shown in FIGS. 3-4 are each described in more illustrative detail in the sub-sections 1-3 that follow. A fourth possible mode of processing, where the PHY would control actuation of the initialization operation, with the memory controller controlling actuation of the training operation, is not preferable as it would afford little if any practical gain in efficiency, simplicity, degree of control, or the like in typical applications.

Where the PHY 4 is to take control of actuating one or both of the initialization and training operations for power-on processing while maintaining compliance with the DFI protocol, it actuates the operation(s) preferably during the period between assertions of the DFI init start signal and the DFI init complete signal thereafter. This time period is illustrated in FIG. 2D, with reference to a system clock signal. Assertion of the DFI init complete signal by the PHY 4, then, not only means that certain initializations have been made to accommodate further initialization and/or training commands, but that the memory controller 1 and PHY 4 are now primed and ready to accept actual read and write memory access commands.

Since the PHY 4 is taking on more of the power-on processing intelligence, the memory controller may be relieved of some power-on processing intelligence in certain embodiments and applications. In fact, for those embodiments configured for use with such memories as of the so-called LPDDR4 type (Low Power Double Data Rate, generation 4) specially adapted for extremely high speed mobile data applications, the memory controller 1 may be altogether relieved of all training control intelligence.

Figure 2A:
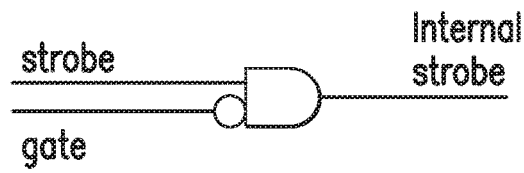
FIG. 2A is a schematic diagram of sample waveforms illustrating an example of strobe signal gating to generate an internal strobe signal.
Figure 2B:
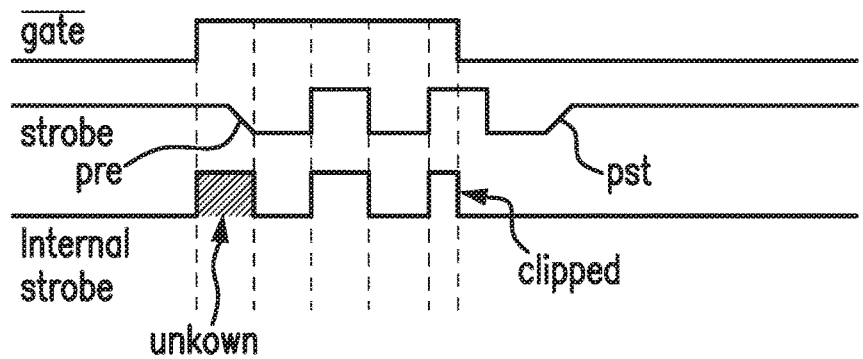
FIG. 2B is a simplified timing diagram of sample waveforms for gating a strobe signal, illustrating a situation where corrective leveling is needed to remove time skew between a strobe signal and its corresponding data signal.
Figure 2C:
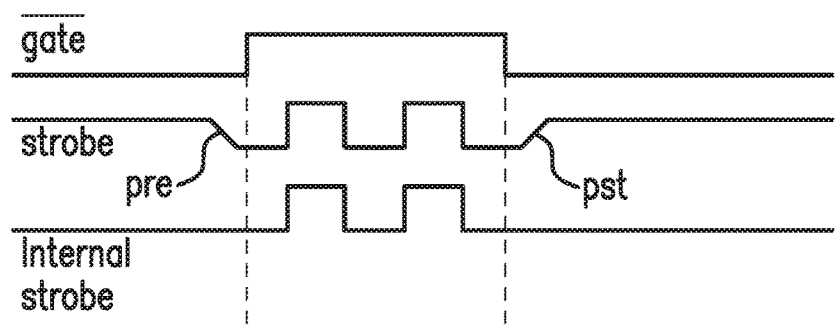
FIG. 2C is a simplified timing diagram of sample waveforms for gating a strobe signal, illustrating a situation where a strobe signal is aligned in time with its corresponding data signal.
Figure 2D:
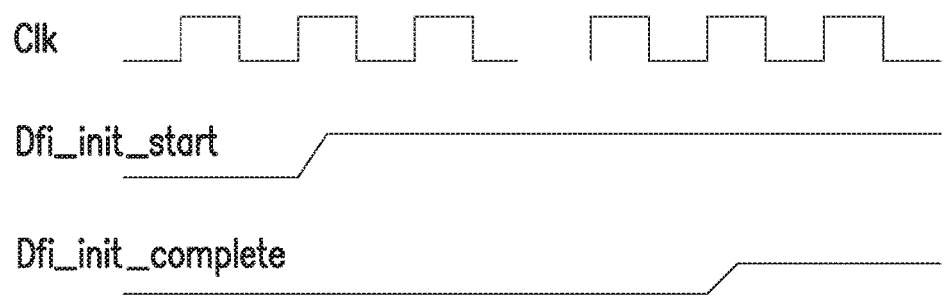
FIG. 2D is a simplified timing diagram of sample waveforms illustrating a relative juxtaposition in time of certain handshake signals asserted according to a certain communication protocol.

Some of the hardware-specific training typically carried out in the PHY 4 (irrespective of whether the memory controller or PHY controls actuation) with respect to the memory device(s) at hand are illustrated in FIGS. 2A-2C. DDR memory devices of the type widely used in the art employ source synchronous clocking, whereby a data signal (DQ) is provided with a commonly sourced strobe signal (DQS) corresponding thereto. Reading or writing of the data signal is then synchronized with its strobe signal. Due to relative differences and variations in physical and environmental factors, however, corresponding DQ and DQS signals may undergo uneven delay in propagating through their respective signal paths, yielding unwanted timing skew between the DQ and DQS signals. Consequently, suitable 'leveling' is required to remove this timing skew and thereby compensate for the potential loss of synchronization that could result. Separate leveling is typically required for signal paths in connection with properly reading and writing, given the different DQ/DQS signal paths therefor.

Leveling techniques with respect to properly reading and writing from given memory devices are known in the art. Any suitable technique known in the art may be employed in the disclosed system and method in view of the particular memory type at hand. The required leveling is normally carried out as part of the system training operation, and typically entails adjustments applied to the timing characteristics of transistor level components in the PHY's circuitry.

In connection with memory read operations, for example, when the memory receives a read command, it sends the data back at the appropriately programmed time. With source synchronous clocking, a corresponding DQS strobe signal is used for timely sampling of the DQ data at the destination. The strobe signal typically starts off tri-stated, then is driven low for a pre-amble (pre), and pulses the number of times needed to capture the data on both the rising and falling edges. The strobe signal is then driven low for the post amble (pst), then tri-stated.

FIG. 2A schematically illustrates one example by which the PHY blocks (or gates) a read strobe signal to capture the same, ideally from a time just prior to the pre-amble to a time just after the post-amble in an internal strobe. The strobe signal in this example is logically combined with a gate signal (such as by an AND gate in the illustrated example) to provide the internal strobe signal. Because of time delays, the precise points at which to pass the strobe signal, and when to gate the strobe signal need to be adjusted.

Read leveling involves time-shifting adjustment of the strobe signal to align in time with the center of the data signal's eye. Gate leveling involves time-shifting adjustment of a gate signal to likewise align in time with the strobe signal.

In the situation schematically illustrated in FIG. 2B, the gate signal (hence the corresponding data signal aligned therewith) is not correctly positioned in time relative to the strobe signal, potentially yielding unknown and clipped portions in the internal strobe signal that results. Leveling is required for correction. In the situation schematically illustrated in FIG. 2C, the gate signal is correctly positioned in time relative to the strobe signal. The leveling carried out in the PHY 4 as part of the memory system training operation preferably incorporates such corrective adjustment for command/address and data signals in connection with both read and write cases for the particular memory device to be accessed.

As illustrated in FIG. 2D, when the PHY 4 is called upon to control actuation of the training operation (and the memory controller retains control over initialization), the various commands and tasks required for training are preferably completed during the time interval extending between the system's assertion of the DFI standard's DFI init start signal and the PHY's responsive assertion of the DFI init complete signal. Likewise, when the PHY 4 is called upon to control actuation of both the initialization and training operations, the various commands and tasks required in that regard are preferably completed during this time interval. In the legacy mode of power-on processing (where the memory controller 1 retains control in actuating both the initialization and training), certain initialization and training operations are completed after assertion of the DFI init complete signal has occurred.

Turning now to FIG. 3, there is shown a schematic diagram illustrating the intercoupling of certain functional components of the command control segment 10 within the memory controller portion 1, and certain functional components 40 of the PHY 4 as formed in accordance with one exemplary embodiment of the present invention. In the interests of brevity and clarity, only certain components of the overall command control segment 10 and PHY 4 pertaining to power-on processing are illustrated. Those other components of the command control segment 10, of the other segments 20, 30 of the memory controller portion 1, and of the PHY 4 which are not shown or specifically described may be of any suitable type known in the art configured to suit the particularly intended application. The details of such other portions and segments will be apparent to those skilled in the art.

Both the command control segment 10 and PHY components 40 in the illustrated embodiment are suitably configured for implementation in accordance with the DFI standard, but may be configured to suit other applicable standards in alternate embodiments. The command control segment 10 in this embodiment includes a power on block 13 and a PHY master block 14 which communicate with the master control application 2 through a system interface 11 (such as the user interface ports 3 shown in FIG. 1), in view of parametric values programmably set responsive to the master control 2 and held in a plurality of configuration registers 12. The blocks 13, 14 communicate with components of the PHY 40 preferably through a DFI bus interface 15 (45 in the PHY 40).

The PHY 40 in this embodiment includes a power on block 42 served by a plurality of configuration registers 41 which also holds parametric values programmably set responsive to the master control 2. The power on block 42 communicates with the memory controller's command control segment 10 preferably via a DFI bus interface 45. The PHY 40 also includes suitable components to maintain separate path blocks 43, 44 for control and address signals on the one hand, and data signals on the other, for passage to the memory 5 via a suitable memory interface 46. The data is formatted for passage to the given memory device(s) 5 in data slices consistent in format therewith.

The system interface 11 of the command control segment 10 may include an AXI bus or other suitable transmission medium for passage of commands and data signals from and to the master control 2. The configuration registers 12, 41 are preferably provided to hold amongst its parametric values a multi-bit indication of the power-on processing mode selected for the given application. Other parametric settings held by the configuration registers 12, 41 preferably include various timing parameters for the memory device(s) 5 at hand; parameters qualifying read and write processes; and, the like.

Once all the configuration registers 12, 41 are programmed accordingly, an activation signal, such as a param start signal defined by DFI protocol, is asserted to trigger activation of the power on block 13, 42 in the command control segment 10 and/or PHY 40 to be used for actuation of the required power-on initialization and training operations. The power on blocks 13, 42 are each preferably formed by state machines suitably configured with initialization and training sections 13*a*, 13*b* and 42*a*, 42*b*. Depending on the particularly intended application, these sections 13*a*, 13*b* and 42*a*, 42*b* may be formed by single or multiple state machines. In the illustrated embodiment, for example, the initialization sections 13*a*, 42*a* are each preferably with a single state machine, which runs through the steps prescribed for the given type of memory, while the training sections 13*b*, 42*b* are each preferably formed with a multiple state machine, one state per required training type.

In accordance with the mode of power-on processing selectively set in the configuration registers 13, 41, one or both of the memory controller (command control segment 10) and PHY 40 participates in controlling the required initialization and training operations.

1. Memory Controller Actuates Both Initialization and Training

Where the memory controller is to control the initialization operation, the initialization section 13*a* sends out commands through the DFI interface 15 to the PHY's power on block 42. Given the selected mode of operation, these initialization commands from the memory controller are permitted to simply pass through (or altogether bypass) the power on block 42. Suitable multiplexers 42*c* provided in the PHY 40 are switched according to the selected mode of power-on processing to pass the control/address and data signals associated with the sent commands for appropriately formatted passage respectively through the paths 43, 44, on to the memory interface 46.

In this legacy mode (mode 01), the required training commands are issued by the training section 13*b* of the memory controller and passed through (or bypass) the PHY's power on block 42 to the multiplexers 42*c*. The control/address and data signals associated the issued training commands are passed for appropriately formatted passage through respective paths 43, 44, on to the memory interface 46.

Within the path blocks 43, 44 of the PHY 40, synchronization logic is suitably implemented to apply the format and timing of signals in a manner consistent with the memory device(s) 5. It is in these blocks 43, 44, for example, where signals received in single data rate form are converted to double data rate form. This preferably includes carrying out the required leveling operations to support proper read/write, and formatting of the data in a plurality of parallel multi-bit slices (for instance, in 8-bit slices).

2. Memory Controller Actuates Initialization; PHY Actuates Training

In this shared mode (mode 10) of power-on processing, the memory controller controls the initialization operation, while the PHY 40 controls the training operation. The memory controller's initialization section 13a thus sends out commands through the DFI interface 15 to the PHY's power on block 42 for unaltered passage through the PHY's power on block 42, on to the memory interface 46 through the multiplexers 42c and paths 43, 44.

Once the initialization part is carried out by the initialization block 13a, the training block 13b passes control to the training block 42b of the PHY 40, and thereafter effectively remains idle during the training operation which subsequently occurs. Control is passed in this manner via the PHY master block 14, which participates in a Request/Acknowledge handshake specified by the applicable DFI protocol with the PHY's power on block 42. In the illustrated embodiment, the PHY power on block 42 knows from settings in its configuration registers 41, and its training section 42b initiates the handshake by asserting a Request to the PHY master block 14 of the memory controller and waits until it returns an Acknowledge via the DFI interfaces 15, 45.

Training operation control is thereby passed to the training section 42b of the PHY power on block 42, which then sends out the required training operation commands. The multiplexers 42c are switched to pass the signals received from the PHY power on block 42 (rather than from the memory controller's power on block 13). The signals passed into the path blocks 43, 44 at single data rate are sent out thereby at double data rate, on through the memory interface 46 and out to the memory 5, as needed to carry out the training operation.

Upon completion of the required training, the PHY training section 42b de-asserts the PHY master Request through the DFI interfaces 45 and 15. More specifically, when the PHY master block 14 sees the handshake Request de-asserted, it responsively de-asserts the handshake Acknowledge. Control is then passed back to the memory controller's power on block 13, and normal memory control operations for memory access may occur.

3. PHY Actuates Both Initialization and Training

In this fully delegated, or fully independent, mode (mode 11) of power-on processing, the PHY 40 controls both the initialization and training operations. The PHY's power on block 42 in this mode also Requests through the PHY master block 14 control of the main memory bus, namely the DFI interface bus in the illustrated embodiment, such that it may execute commands out to memory 5. The PHY master block 14 thus serves much as an arbiter, through which the PHY Requests control, and the memory controller relinquishes control by asserting a responsive Acknowledge signal. The PHY's power on block 42 either remains idle or conducts other peripheral operations until it is granted sufficient control by the memory controller to start driving power-on processing commands out to memory. The Acknowledge signal asserted by the memory controller provides assurance that the memory controller itself, and the PHY power on block 42 need not worry about any bus contention.

At the start of this mode, a program start bit value is set in the configuration registers 12 responsive to the master control 2. In practice, the power on block 13 in the illustrated embodiment may actually still execute some preliminary initialization steps as prescribed by the applicable DFI protocol, before the memory controller is prompted to assert the DFI init start signal. This signal remains asserted until the PHY asserts its DFI init complete signal at some point thereafter. Once DFI init start is asserted in this mode, the memory controller takes no further part in controlling any initialization or training operation. The memory controller essentially passes control to the PHY 40.

The PHY 40, in addition to locking its DLL's in response to the DFI init start signal, and proceeds further to control actuation to complete all remaining initialization and training steps. So before it asserts the DFI init complete signal, the initialization and training sections 42a, 42b of the PHY power on block 42 execute to actuate the required steps. As with the other modes, the initialization section 42a sends out the necessary initialization commands through the MUX's 42c for appropriate conversion within the address/control and data path components 43, 44 to proper double data rate form for passage through the memory interface 56 out to the memory 5.

Once initialization is completed, the training block 42b kicks in, and the required training steps are actuated using training commands issued, converted, and passed out to the memory 5 in this manner. The DFI init complete is not asserted until all of the training operation is completed. When this signal is asserted, control is passed back to the memory controller as usual. But instead of continuing with any further initialization or training, the memory controller recognizes that the PHY 40 has completed both (by virtue of indicative settings held in its configuration registers 12), the memory controller proceeds with normal operation in its powered up state, controlling read/write access to the memory 5.

The preceding paragraphs illustrate but one preferred way of passing control to the PHY 40 for initialization and/or training. In other applications and implementations, the memory controller may be prompted to assert the DFI init start signal, and the PHY prompted to subsequently assert the DFI init complete signal, whereafter the PHY Requests control through the PHY master block 14 interface. The memory controller then relinquishes control to the PHY 40 to alternatively carry out the required initialization and training outside the DFI init start DFI init complete handshake.

Power-on Processing: Operational Flow Example

Referring now to FIG. 4, there is shown a flow diagram illustrating a flow of processes carried out for selectively distributed power-on processing by a system and method implemented in accordance with the embodiment illustrated in FIGS. 1-3. Power-on processing is initiated at process 100, as part of an initial powering up or booting sequence for the system, or alternatively as part of a system restart or re-boot sequence. The flow proceeds from there to a pre-initialization process 102, where the memory controller carries out certain preliminary, or base, initialization steps then asserts the DFI init start signal. At this point, it is determined whether the memory controller has been selected to maintain control over actuation of the required initialization operation. If so, the flow proceeds to process 106a, where a handshake with the PHY is established. If not, the flow alternatively proceeds to process 103a towards passing control on to the PHY for control of the required initialization operation.

Turning first to the case where the memory controller is to maintain control over the required initialization, the memory controller asserts the DFI init start signal, whereupon certain preparatory actions are responsively taken in the PHY like locking its DLL's, checking clock stability, and other suitable steps to ready itself to accept further commands from the memory controller. The PHY thereafter asserts the DFI init complete signal to complete the handshake, and the flow proceeds to process 106b, where a memory reset signal is asserted (or complementarily, a low-active reset_n signal is driven to 0 value as shown), such that the memory 5 may be reset. The CKE (clock enable), a standard memory signal typically defined at a designated interconnection pin of the memory, is de-asserted so as to ungate the memory's clock and thereby lock the clock to the memory. The memory's clock is then started at process 106c and permitted to run until it stabilizes. When the clock is stabilized, the reset signal is de-asserted at process 106d, and a predefined amount of time tinit, specified in value according to the particular memory device 5 at hand, is allowed to pass at process 106e. After the time period tinit has elapsed, the CKE signal is asserted at process 106f to enable the clock to the memory.

The flow then flows to a certain series of processes required by the memory device. This typically includes a precharge (PRE) step at process 106g, an auto refresh (AREF) step at process 106h, a mode register write (MRW) step at process 106i, and an output impedance control (ZQ) calibration step at process 106j. The mode register writes at process 106i relate to configuration registers disposed within the actual memory device, and the process of programmably configuring them for proper communication therewith.

Upon completing this series of processes, the flow proceeds to a decision point at process 108, where it is determined whether the memory controller has been selected to also control actuation of the required training operation. If so, the flow continues through the YES branch to process 109a, where various leveling processes are carried out. These include command and address bus (CA) leveling at process 109a, read (RD) gate leveling at process 109b, read leveling at process 109c, and write (WR) leveling at process 109d. Voltage reference (VREF) training follows at process 109e. Having completed all the required initialization and training operations, the memory controller is then disposed in a power up state, and primed to accept commands from the master control 2 to execute read and write operations on the memory 5. This is indicated by the process 111, to which the flow proceeds.

If at process 108, it is determined that actuation of the training operation is to be controlled by the PHY instead of the memory controller, then the flow proceeds from there alternatively to process 110, where a further decision is made as to whether the appropriate Request has been asserted in the PHY master block 14 of the memory controller's command control segment 10 (FIG. 3). That is, a check is made at process 110 of the PHY's readiness to take control of processing. If not, the flow proceeds directly to process 111, skipping PHY-actuated training and powering up the system for memory control operation. This may be tolerable in situations where, for instance, sufficiently low speed or other conservative operation is anticipated that the risk of error due to lack of training would remain minimal.

If the PHY is ready, having asserted the appropriate Request in the PHY master block 14, the flow proceeds from process 110 to process 112a, where the PHY training handshake is completed by the PHY master block's assertion of the responsive Acknowledge. The memory controller thereby passes control of the DFI bus and memory bus to the PHY. The PHY then actuates the various leveling processes 112b-112e to carry out CA bus leveling, RD gate leveling, RD leveling, and WR leveling, followed by VREF training at process 112f. The PHY then de-asserts the PHY master Request at process 112g to pass control back to the memory controller. Then memory controller responds by de-asserting its PHY master Acknowledge at process 112h. The flow proceed, then, to process 111 where the system transitions to its powered up state and begins accepting read and write commands.

Among the advantages of controlling the initialization and/or training operations via the PHY as opposed to the memory controller is that certain processes may be carried out quicker and with more efficiency. This is particularly notable with certain training processes, as much of those training processes involve adjusting delay lines within the PHY itself.

Referring back to the decision point at process 102, if it is determined that the PHY is selected to control actuation of the initialization operation, the flow proceeds from there alternatively to process 103a, where the memory reset signal is de-asserted (by complementarily driving the low-active reset_n signal to 1 value as shown), such that the memory reset is disabled. The CKE signal is asserted at process 103b, so as to gate the memory's clock. Since it is the PHY driving these signals to memory, and the timing requirements needed for this are established in the PHY, the PHY knows when to start the needed timers when it acquires control over initialization, and knows the correct amount of time to wait.

At process 103c, the memory controller drives a DFI frequency signal with an encoded frequency representing the boot frequency for the system clock. When the memory controller is actuating initialization, this signal typically remains of don't care value under DFI specification during power-up. According to that specification, the DFI frequency signal is driven to indicate the encoded value when the system clock is to be changed in frequency. This normally occurs in the illustrated embodiment where the PHY controls initialization, with the memory controller driving the DFI frequency signal when the DFI init start signal asserts. At process 103d, the memory controller asserts the DFI init start signal, and thereby passes control to the PHY. The memory controller then waits for the DFI init complete signal to be subsequently asserted. Before the PHY actually asserts the DFI init complete signal, however, it carries out the initialization and/or training operations distributed thereto according to the selected mode of power-on processing. Thus, from process 103e through 103m, the PHY actuates much the same initialization procedure that the memory controller would carry out through its processes 106b-106j. That is, the PHY drives the reset_n and CKE signals low out to memory, and start the memory clock, then once the clock is stable, de-assert the reset_n signal. Following this, the PHY waits for the time period tinit to elapse, at which point it drives the CKE signal high. With the CKE signal having been driven high, the PHY actuates the precharge, autorefresh, mode register write, and ZQ calibration processes to complete initialization.

The flow next proceeds to a decision point at process 104, where it is determined whether the PHY is selected to also conduct the training operation. If not, the flow proceeds immediately to process 105, where control is returned to the memory controller. As indicated by the broken arrow, process 111 eventually follows for transitioning of the system to its powered up state.

If the PHY is indeed selected to also conduct the training operation, it proceeds to actuate the required training procedure. Through the processes 104a-104e, the PHY actuates much the same training procedure that the memory controller would carry out through its processes 109a-109e. That is, the PHY actuates the CA bus leveling, RD gate leveling, RD leveling, and WR leveling, followed by VREF training. At process 105, control is returned to the memory controller by the PHY's asserting the DFI init complete signal to the PHY master block. Again, as indicated by the broken arrow, process 111 eventually follows for transitioning of the system to its powered up state. But once control is returned to the memory controller via process 105, the determination is actually made via the PHY master block at process 110 that initialization and the training have been completed, and that the system is ready to transition to its normal powered up state. The flow proceeds accordingly to process 111.

Multiple Frequency Support

The memory controller and PHY portions disclosed in the illustrated embodiment may be configured to support operation at different frequencies. To aid in quickly changing from one frequency to another, for example, multiple copies (versions) of parametric values that are frequency dependent may be maintained based on corresponding frequencies. These 'frequency copies' may be maintained in the configuration registers 12, 41 of the memory controller's command control segment 10 and PHY 40.

With this support multiple frequency operation, training may vary for the different frequencies. The training would be dependent on the memory technology, and memory types whose mode registers support only one frequency copy (for example, DDR3, DDR4, LPDDR2, LPDDR3, or the like), the initialization and training would occur only at a current operating frequency. Memories whose mode registers support more than one frequency copy (for example, LPDDR4 or the like), the memory controller or PHY preferably actuates training for multiple frequencies as part of the initial training, with the frequencies to be trained for being selected through programmable configuration registers 12, 41.

Power Up from Self-Refresh

In certain applications, the system may operate to place memory into self-refresh and then power down or reset the memory sub-system. This is a way to conserve power and not lose the content of memory. Since the memory subsystem has been reset, it would typically need to go through its initialization procedure again. For the most part, this initialization would remain much the same as described herein. Whichever portion is controlling such post self-refresh initialization of memory—either the memory controller or PHY—is preferably configured with suitable measures to provide for assertion and processing of a self-refresh exit command to exit to bypass the normal initialization procedure. For example, if the PHY 40 were controlling initialization, when the DFI init start signal is asserted, the PHY 40 may issue a self-refresh exit command, then proceed with the training operation, with the DFI init complete being asserted upon completion of training.

Although this invention has been described in connection with specific forms and embodiments thereof, it will be appreciated that various modifications other than those discussed above may be resorted to without departing from the spirit or scope of the invention as defined in the appended claims. For example, functionally equivalent elements or processes may be substituted for those specifically shown and described, certain features may be used independently of other features, and in certain cases, particular locations of the elements or processes may be reversed or interposed, all without departing from the spirit or scope of the invention as defined in the appended claims.

What is claimed is:

1. A system for controlling access to a memory device according to a master control operation, the system having selectively distributed power-on processing, comprising:
   a memory controller portion executing responsive the master control operation to actuate a plurality of operational tasks on the memory device of a particular type of memory of a plurality of types of memory by asserting an initialization signal, the operational tasks including at least read and write operations for selectively addressed storage locations defined in the memory device, said memory controller portion further including:
      a first power-on block executable to actuate one or both of an initialization operation and a training operation corresponding to the memory device, and
      a physical interface (PHY) master block coupled to said first power-on block;
   a PHY portion coupled to said memory controller portion, said PHY portion executing to adaptively configure control, address, and data signals for physically compatible passage between said memory controller portion and the memory device of the particular type of memory, said PHY portion including a second power-on block executable to actuate one or both of an initialization operation and a training operation corresponding to the memory device;
   the PHY master block executing to selectively pass control to one of said memory controller and PHY portions over an interface bus interconnected therebetween, said PHY master block being executable to pass control of said interface bus to said PHY portion for execution of the training operation by said power-on block in at least one power-on processing mode of a plurality of power-on processing modes; and
   a set of one or more configuration registers that store a plurality of copies of parametric values that are frequency dependent, such that each copy of the plurality of copies depends on a frequency that is associated with a corresponding memory type of the plurality of types of memory, wherein the configuration registers serve the memory controller and the PHY portion;
   wherein said PHY portion is configured according to the initialization and training operations, each of the initialization and training operations being selectively actuated responsive to one of said first and second power on blocks based on the particular type of memory of the memory device:
      wherein the configuration registers are set to hold a predefined parametric value that indicates a power-on processing mode selected from a plurality of power-on processing modes, wherein the plurality of power-on processing modes includes:
         a first power-on processing mode wherein both of the initialization and training operations of said first power-on block are selectively enabled and executed;

a second power-on processing mode wherein the initialization and training operations of said first power-on processing mode wherein the initialization operation of said first power-on block and the training operation of said second power-on block are each selectively enabled and executed; and, a third power-on processing mode wherein both the initialization and training operations of said second power-on block are selectively enabled and executed.

2. The system as recited in claim 1, wherein each of said first and second power-on blocks includes an initialization state machine and a training state machine, said initialization and training state machines being independently executable.

3. The system as recited in claim 1, wherein:
said memory controller portion includes a first configuration block coupled to said first power-on block to selectively enable or disable each of the initialization and training operations thereof; and,
said PHY portion includes a second configuration block coupled to said second power-on block to selectively enable or disable each of the initialization and training operations thereof.

4. The system as recited in claim 3, wherein each of said first and second configuration blocks includes the plurality of configuration registers set responsive to the master control operation.

5. The system as recited in claim 1, wherein:
the initialization operation of the first and second power-on blocks includes:
applying power;
awaiting a first predetermined time period for stabilization of a memory clock;
de-asserting a reset parameter of the memory device;
awaiting a second time period predefined for the memory device;
asserting a clock enable (CKE) signal;
awaiting a third predetermined time period;
programming a plurality of configuration registers to selectively indicate an applicable mode of power-on processing; and,
executing output impedance control (ZQ) calibration; and,
the training operation of the first and second power-on blocks includes:
leveling with respect to a command and address (CA) bus;
leveling with respect to a write bus; and,
leveling with respect to a data (DQ) bus.

6. The system as recited in claim 1, wherein said PHY portion includes:
a data path block executing to reformat data signals in data slices configured for different data rate formats;
a synchronization block executing to generate write and read levelling adjustments for address and data signals passed to and from the memory device; and,
first and second multiplexer blocks coupled to selectively switch the initialization operation from one of said first and second power-on blocks respectively to said data path and synchronization blocks, and to selectively switch the training operation from one of said first and second power-on blocks respectively to said data path and synchronization blocks.

7. The system as recited in claim 1, wherein said memory controller and PHY portions are configured according to an interface protocol defined by a predetermined Double Data Rate (DDR) PHY interface (DFI) standard, and said interface bus is of a DFI interface bus format.

8. A system for controlling access to a memory device according to a master control operation, the system having selectively distributed power-on processing, comprising:
a memory controller portion executing responsive the master control operation to actuate a plurality of operational tasks on the memory device of a particular type of memory of a plurality of types of memory, the operational tasks including at least read and write operations for selectively addressed storage locations defined in the memory device, said memory controller portion including:
a first power-on block executable to actuate one or both of an initialization operation and a training operation corresponding to the memory device;
a physical interface (PHY) master block coupled to said first power-on block and,
a first configuration block coupled to said first power-on block to selectively enable or disable each of the initialization and training operations thereof;
a PHY portion coupled to said memory controller portion, said PHY portion executing to adaptively configure control, address, and data signals for physically compatible passage between said memory controller portion and the memory device of the particular type of memory, said PHY portion including:
a second power-on block executable to actuate one or both of an initialization operation and a training operation corresponding to the memory device; and,
a second configuration block coupled to said second power-on block to selectively enable or disable each of the initialization and training operations thereof;
the PHY master block executing to selectively pass control to one of said memory controller and PHY portions over an interface bus interconnected therebetween, said PHY master block being executable to pass control of said interface bus to said PHY portion for execution of the training operation by said power-on block in at least one power-on processing mode of a plurality of power-on processing modes; and
a set of one or more configuration registers that store a plurality of copies of parametric values that are frequency dependent, such that each copy of the plurality of copies depends on a frequency that is associated with a corresponding memory type of the plurality of types of memory, wherein the configuration registers serve the memory controller and the PHY portion;
wherein each of said first and second power-on blocks includes an initialization state machine and a training state machine, said initialization and training state machines being independently executable, and said PHY portion is configured according to the initialization and training operations, each of the initialization and training operations being selectively actuated responsive to one of said first and second power on blocks based on the particular type of memory of the memory device;
wherein the configuration registers are set to hold a predefined parametric value that indicates a power-on processing mode selected from a plurality of power-on processing modes, wherein the plurality of power-on processing modes includes:
a first power-on processing mode wherein both of the initialization and training operations of said first power-on block are selectively enabled and executed;

a second power-on processing mode wherein the initialization and training operations of said first power-on processing mode wherein the initialization operation of said first power-on block and the training operation of said second power-on block are each selectively enabled and executed; and, a third power-on processing mode wherein both the initialization and training operations of said second power-on block are selectively enabled and executed.

9. The system as recited in claim 8, wherein said memory controller and PHY portions are configured according to an interface protocol defined by a predetermined Double Data Rate (DDR) PHY interface (DFI) standard, and interconnected by a DFI interface bus.

10. The system as recited in claim 8, wherein each of said first and second configuration blocks includes the plurality of configuration registers set responsive to the master control operation.

11. The system as recited in claim 8, wherein said PHY portion includes:
   a data path block executing to reformat data signals in data slices configured for different data rate formats;
   a synchronization block executing to generate write and read levelling adjustments for address and data signals passed to and from the memory device; and,
   first and second multiplexor blocks coupled to selectively switch the initialization operation from one of said first and second power-on blocks respectively to said data path and synchronization blocks, and to selectively switch the training operation from one of said first and second power-on blocks respectively to said data path and synchronization blocks.

12. A method for controlling access to a memory device according to a master control operation, with selectively distributed power-on processing, comprising:
   executing a memory controller portion responsive to the master control operation to actuate a plurality of operational tasks on the memory device by asserting an initialization signal, the operational tasks including at least read and write operations for selectively addressed storage locations defined in the memory device, wherein the memory device is a particular type of memory of a plurality of types of memory;
   establishing in said memory controller portion a first power-on block executable to actuate one or both of an initialization operation and a training operation corresponding to the memory device;
   executing a physical interface (PHY) portion coupled to said memory controller portion to adaptively configure control, address, and data signals for physically compatible passage between said memory controller portion and the memory device of the particular type of memory;
   establishing in said PHY portion a second power-on block executable to actuate one or both of an initialization operation and a training operation corresponding to the memory device of the particular type of memory;
   executing a PHY master block coupled to said first power-on block to selectively pass control to one of said memory controller and PHY portions over an interface bus interconnected therebetween, said PHY master block being executable to pass control of said interface bus to said PHY portion for execution of the training operation by said second power-on block in at least one power-on processing mode of a plurality of power-on processing modes;
   setting one or more configuration registers to store a plurality of copies of parametric values that are frequency dependent, such that each copy of the plurality of copies depends on a frequency that is associated with a corresponding memory type of the plurality of types of memory, wherein the configuration registers serve the memory controller and the PHY portion;
   selectively actuating each of the initialization and training operations responsive to one of said first and second power on blocks based on the particular type of memory of the memory device; and,
   configuring said PHY portion according to the training operation;
      wherein a predefined parametric value indicates a power-on processing mode selected from the plurality of power-on processing modes, wherein the predefined parametric value is stored in one or more configuration registers serving the memory controller and the PHY portion to activate the selected power-on processing mode, wherein the plurality of power-on processing modes includes:
      a first power-on processing mode wherein both of the initialization and training operations of said first power-on block are selectively enabled and executed;
      a second power-on processing mode wherein the initialization and training operations of said first power-on processing mode wherein the initialization operation of said first power-on block and the training operation of said second power-on block are each selectively enabled and executed; and,
      a third power-on processing mode wherein both the initialization and training operations of said second power-on block are selectively enabled and executed.

13. The method as recited in claim 12, wherein:
   the initialization and training operations of each of said first and second power-on blocks is carried out according to independently executable state machines corresponding respectively thereto;
   the initialization and training operations of said first power-on block are selectively enable or disable according to at least one first configuration register programmed according to the master control operation; and,
   the initialization and training operations of said second power-on block are selectively enable or disable according to at least one second configuration register programmed according to the master control operation.

14. The method as recited in claim 12, wherein:
   said memory controller and PHY portions are configured according to an interface protocol defined by a predetermined Double Data Rate (DDR) PHY interface (DFI) standard, and interconnected by a DFI interface bus;
   said PHY portion executes:
      a data path block for reformatting data signals in data slices configured for different data rate formats;
      a synchronization block for generating write and read levelling adjustments for address and data signals passed to and from the memory device; and,
      first and second multiplexer blocks for selectively switching the initialization operation from one of said first and second power-on blocks respectively to said data path and synchronization blocks, and to selectively switch the training operation from one of said first and second power-on blocks respectively to said data path and synchronization blocks.

15. The system of claim 1, wherein the memory controller portion comprises a first proper subset of the set of the one or more configuration registers and the PHY portion comprises a second proper subset of the one or more configuration registers, such that the PHY portion is configured to independently actuate the initialization and training operations for power on processing.

* * * * *